(12) United States Patent
Todd et al.

(10) Patent No.: US 8,720,568 B2
(45) Date of Patent: May 13, 2014

(54) SWELLABLE/DEGRADABLE "SAND" PLUG SYSTEM FOR HORIZONTAL WELLS

(75) Inventors: Bradley L. Todd, Duncan, OK (US); Stanley J. Heath, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 397 days.

(21) Appl. No.: 12/813,843

(22) Filed: Jun. 11, 2010

(65) Prior Publication Data

US 2011/0303411 A1 Dec. 15, 2011

(51) Int. Cl.
*E21B 33/13* (2006.01)

(52) U.S. Cl.
USPC ............ 166/300; 166/285; 166/278; 166/293

(58) Field of Classification Search
USPC ............................... 166/300, 285; 106/287.26
See application file for complete search history.

(56) References Cited

U.S. PATENT DOCUMENTS

| | | | |
|---|---|---|---|
| 3,783,940 A | 1/1974 | Urbanosky | |
| 3,794,115 A * | 2/1974 | Skagerberg | 166/294 |
| 5,184,679 A * | 2/1993 | Lau | 166/278 |
| 5,343,947 A * | 9/1994 | Cowan et al. | 166/292 |
| 6,165,947 A * | 12/2000 | Chang et al. | 507/216 |
| 6,889,766 B2 | 5/2005 | Creel et al. | |
| 6,896,058 B2 * | 5/2005 | Munoz et al. | 166/279 |
| 7,032,663 B2 * | 4/2006 | Nguyen | 166/276 |
| 7,216,705 B2 * | 5/2007 | Saini et al. | 166/279 |
| 7,276,466 B2 * | 10/2007 | Todd et al. | 507/260 |
| 7,506,689 B2 * | 3/2009 | Surjaatmadja et al. | 166/280.2 |
| 2004/0168798 A1 | 9/2004 | Creel et al. | |
| 2004/0168802 A1 | 9/2004 | Creel et al. | |
| 2004/0220058 A1 | 11/2004 | Eoff et al. | |
| 2006/0086501 A1 | 4/2006 | Creel et al. | |
| 2006/0169455 A1 | 8/2006 | Everett et al. | |
| 2006/0213662 A1 | 9/2006 | Creel et al. | |
| 2006/0234871 A1 | 10/2006 | Dalrymple et al. | |
| 2007/0277979 A1 | 12/2007 | Todd et al. | |
| 2009/0223667 A1 | 9/2009 | Rispler | |
| 2009/0242202 A1 | 10/2009 | Rispler et al. | |

FOREIGN PATENT DOCUMENTS

| | | |
|---|---|---|
| EP | 1 413 710 | 4/2004 |
| WO | 2004/076808 A1 | 9/2004 |
| WO | 2004/076812 A1 | 9/2004 |
| WO | 2005/119003 A1 | 12/2005 |
| WO | 2006/061561 A1 | 6/2006 |
| WO | 2006/082363 A1 | 8/2006 |
| WO | 2007/083109 A1 | 7/2007 |
| WO | WO 2009/027685 | 3/2009 |
| WO | WO 2009/118512 | 10/2009 |

OTHER PUBLICATIONS

International Search Report for International Application No. PCT/GB2011/000886, 4 pages.
Written Opinion of the International Searching Authority for International Application No. PCT/GB2011/000886, 9 pages.

* cited by examiner

*Primary Examiner* — Zakiya W Bates
*Assistant Examiner* — Silvana Runyan
(74) *Attorney, Agent, or Firm* — McDermott Will & Emery LLP; Craig W. Roddy

(57) ABSTRACT

Disclosed herein are swellable and degradable sand plug systems used in wellbores and methods for using the systems in treating wellbores. The slurry composition includes a carrier fluid and a granular borate source material, where the borate source material is at least partially dehydrated or anhydrous. The carrier fluid may be non-aqueous fluid or, in some compositions, an aqueous fluid. The slurry composition is allowed to settle in a horizontal wellbore and at least partially fill at least a portion of the wellbore in a direction vertical to the wellbore, and is exposed to a sufficient amount of aqueous fluid to expand and substantially fill at least a portion of the wellbore, thereby plugging the wellbore. The slurry composition may be exposed to a sufficient amount of aqueous liquid to at least partially dissolve the expanded slurry composition, thereby at least partially removing the plug from the wellbore.

15 Claims, 1 Drawing Sheet

Before:
After
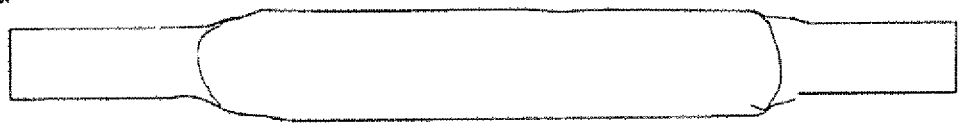

US 8,720,568 B2

SWELLABLE/DEGRADABLE "SAND" PLUG SYSTEM FOR HORIZONTAL WELLS

FIELD OF THE INVENTION

This invention relates to a swellable and degradable sand plug system and the use of the system in treating horizontal wellbores.

BACKGROUND

A wellbore may penetrate various reservoirs, intervals or other zones of interest. In some instances, the length or extent of a wellbore may render it impractical to apply a single treatment to the complete wellbore. For example, a single stimulation operation may be problematic in subterranean formations comprising multiple production zones along the wellbore.

Stimulation operations, such as hydraulic fracturing, acidizing, fracture acidizing, or hydrajetting, are usually performed after the drilling and completion of a wellbore to enhance hydrocarbon production (e.g., oil, gas, etc.) into the wellbore. There are usually multiple zones along a wellbore from which it is desirable to produce hydrocarbons. Different zones tend to have different fracture gradients. Moreover, in a situation wherein some zone along a wellbore is depleted, depletion generally lowers the fracture gradient of the zone. When a stimulation operation is simultaneously conducted on more than one production zone, the stimulation treatment will tend to follow the path of least resistance and to preferentially enter the most depleted zones. Thus a single stimulation operation may not achieve desirable results in those production zones having relatively higher fracture gradients. Therefore, it may be desirable to perform numerous treatments in a number of zones along the length of the wellbore (including both vertical wellbores and horizontal wellbores). In some situation, it may be desirable to perform numerous treatments to different zones of a subterranean zone penetrated by multiple horizontal wellbore constructions where the subterranean zone is intersected by one or more horizontal wellbores extending outwardly from one or more parent wellbores.

One method to isolate a zone of interest and to provide for separate treatments of multiple zones in treatment of a wellbore is to use one or more sand plugs in the wellbore. In a multi-stage fracturing treatment of a vertical wellbore, the wellbore may be perforated through a first, lower zone of interest. A fracturing fluid may then be injected into the vertical wellbore to fracture the formation through the treatment perforations. After the fracturing is completed, a sand plug may be positioned across the treatment perforations. Thereafter, a formation above the sand plug may be perforated and fractured by the same technique. By the use of sand plugs of a variety of depths, a plurality of formations in a vertical wellbore may be fractured and treated independently of one another. However, when the wellbore to be treated is a horizontal wellbore, sand plugs are often difficult to be set in a manner that makes them reliable. For example, in a horizontal wellbore, a sand plug may slump and fail to fully plug the diameter of the wellbore, i.e., the sand plug may not have sufficient height to create a bridge across the wellbore or casing in the wellbore.

Removal of sand plugs in a horizontal wellbore after an isolation stage completes can also be an issue. While a clean-up procedure or a drill-out procedure can be employed to remove the sand plug, it often entails considerable time and expense to carry out. Hence improvements in the sand plug systems, in particular those used in a substantially horizontal wellbore, are still desirable.

SUMMARY OF THE INVENTION

This invention relates to a swellable and degradable sand plug system and the use of the system in treating horizontal wellbores.

One aspect of the invention relates to a method for plugging a substantially horizontal wellbore. The method comprises the steps of introducing into a substantially horizontal wellbore a slurry composition comprising a carrier fluid and a granular borate source material, wherein the borate source material is at least partially dehydrated or anhydrous; allowing the slurry composition to settle in the horizontal wellbore and at least partially fill at least a portion of the horizontal wellbore in a direction vertical to the substantially horizontal wellbore; and exposing the slurry composition to a sufficient amount of aqueous fluid. The aqueous fluid expands the slurry composition to the point that the expanded slurry composition substantially fills at least a portion of the horizontal wellbore in a direction vertical to the horizontal wellbore, thereby plugging the substantially horizontal wellbore. The carrier fluid may be a non-aqueous fluid, or when the average size of the granular borate source material is sufficient large (14 mesh size or larger, e.g., from about 8 mesh to about 14 mesh), the carrier fluid may also be an aqueous fluid.

Another aspect of the invention relates to a method of treating one or more subterranean zones intersected by one or more substantially horizontal wellbores extending outwardly from one or more parent wellbores. The method comprises the steps of introducing into one or more substantially horizontal wellbores a slurry composition comprising a carrier fluid and a granular borate source material, wherein the borate source material is at least partially dehydrated or anhydrous; allowing the slurry composition to settle in the horizontal wellbores and at least partially fill at least a portion of the horizontal wellbores in a direction vertical to the horizontal wellbores; and exposing the slurry composition to a sufficient amount of aqueous fluid. The aqueous fluid expands the slurry composition to the point that the expanded slurry composition substantially fills at least a portion of the horizontal wellbores in a direction vertical to the horizontal wellbores, thereby plugging the horizontal wellbores and treating the subterranean zones intersected by the one or more substantially horizontal wellbores extending outwardly from the parent wellbores.

Yet another aspect of the invention provides a slurry composition for plugging a substantially horizontal wellbore. The slurry composition comprises a carrier fluid and a granular borate source material, wherein the borate source material is at least partially dehydrated or anhydrous. The slurry composition is expandable through sufficient contact with an aqueous fluid and is dissolvable through sufficient contact with an aqueous fluid.

BRIEF DESCRIPTION OF THE DRAWINGS

FIG. 1 is a schematic showing the swelling of Tygon tubing after a slurry composition inside the tubing is exposed to water.

DETAILED DESCRIPTION

This invention relates to methods of treating horizontal wellbores, and more particularly, to a swellable and degradable sand plug system used in horizontal wellbores. Among other things, the methods allow for subterranean operations in a substantially horizontal portion of a wellbore where isolation of a zone of interest for separate treatments of multiple zones of the wellbore is desired.

One aspect of the invention relates to a method for plugging a substantially horizontal wellbore. The method comprises the steps of introducing into a substantially horizontal wellbore a slurry composition comprising a carrier fluid and a granular borate source material, wherein the borate source material is at least partially dehydrated or anhydrous; allowing the slurry composition to settle in the horizontal wellbore and at least partially fill at least a portion of the horizontal wellbore in a direction vertical to the substantially horizontal wellbore; and exposing the slurry composition to a sufficient amount of aqueous fluid. The aqueous fluid expands the slurry composition to the point that the expanded slurry composition substantially fills at least a portion of the horizontal wellbore in a direction vertical to the horizontal wellbore, thereby plugging the substantially horizontal wellbore. The plug formed in the substantially horizontal wellbore is temporary and can be removed by exposing the expanded slurry composition to a sufficient amount of aqueous liquid to at least partially dissolve and degrade the expanded slurry composition.

As used herein, "horizontal wellbore" and "substantially horizontal wellbore" are interchangeable herein, and generally refer to a wellbore with at least a portion having a centerline which departs from vertical by at least about 60°. In some instances, "horizontal wellbore" may refer to a wellbore which, after reaching true 90° horizontal, may actually proceed upward, or become "inverted." In such cases, the angle past 90° is continued, as in 95°, rather than reporting it as deviation from vertical, which would then be 85°.

Some embodiments of the methods are suitable for use on portions of a horizontal wellbore, where at least a portion of the wellbore penetrates a plurality of zones within the subterranean formation and where isolation of a zone of interest is desirable. In some instances, successive isolation of various zones is also desirable in a stimulation operation. For example, when there are multiple zones to be stimulated, following the stimulation of the first zone a slurry composition may be used to plug the wellbore and isolate the first zone from the rest of zones. Next, the second zone may be stimulated and then a sand plug may be placed to isolate the second zone from the zone next to the second zone. Such successive multiple-stage plugging and isolation methods may be performed in an order from downstream to upstream of the wellbore. As used herein, the term "downstream" refers to the locations along a wellbore relatively far away from the wellhead and the term "upstream" refers to locations along the wellbore relatively closer to the wellhead. The plugging and isolation method may be repeatedly used to treat the multiple zones of the wellbore. Alternatively, the plugging and isolation method may be repeatedly used for multiple treatments within the same zone of the wellbore.

To plug a substantially horizontal wellbore, a slurry composition is introduced into the horizontal wellbore. The slurry composition may be delivered to the desired location of the horizontal wellbore through technique known in the art. Exemplary technique of placing sand plugs in a horizontal wellbores or highly deviated wellbores may be found in, e.g., U.S. Patent Application Publication No. 2009/0223667 and U.S. patent application Ser. No. 12/354,551, entitled "Methods of setting particulate plugs in horizontal well bores using low-rate slurries," filed on Jan. 15, 2009, which are incorporated herein by reference in their entirety. For example, the slurry composition may be a pumpable slurry. The slurry composition thus may be pumped into the wellbore at a rate and pressure sufficient to deliver the slurry composition to the desired zone along the wellbore. One of ordinary skill in the art will be able to determine the appropriate pumping rates and settling times according to factors such as wellbore geometry, carrier fluid composition, costs, and supply logistics. Pumping of the slurry composition may take place through a pumping conduit. A pumping conduit may refer to any continuous, enclosed fluid path extending from the surface into a wellbore, including, but not limited to, lengths of pipe, casing, jointed pipe, "spaghetti string", tubing, or coiled tubing.

A slurry composition may also be introduced into a horizontal wellbore through other mechanical means known to one skilled in the art, for instance, through dump-bailing the slurry composition by a dump-bailer tool. A suitable dump-bailer tool may include a mechanical chamber for storing the slurry composition and a ported valve for the slurry composition to discharge from the dump-bailer into the desired location of the horizontal wellbore. The methods and devices of dump-bailer operations are well known to those skilled in the art and may be found, for instance, from the U.S. Pat. No. 3,783,940, herein incorporated by reference in its entirety.

The slurry composition comprises a granular borate source material and a carrier fluid. The borate source material is at least partially dehydrated or anhydrous and expands or swells when hydrated. Granular borate source materials that can be utilized include, but are not limited to, anhydrous boric oxide, anhydrous sodium borate, sodium perborate monohydrate, and combinations thereof. One example of the borate source material used herein is a substantially dehydrated or anhydrous boric oxide. Boric oxide, $B_2O_3$, is typically found in the vitreous state as a colorless glassy solid, and is typically obtained as a white powder. Boric oxide is chemically hygroscopic, i.e., it absorbs moisture or water from the air, and can hydrate to boric acid. Other names for anhydrous boric oxide include diboron trioxide, boric anhydride, anhydrous boric acid.

Substantially dehydrated or anhydrous sodium perborate may also be used as the borate source material. Sodium perborate, $NaBO_3$, crystallizes as the sodium perborate monohydrate, $NaBO_3.H_2O$, and sodium perborate trihydrate, $NaBO_3.3H_2O$, Sodium perborate undergoes hydrolysis in contact with water, producing hydrogen peroxide and borate.

Substantially dehydrated or anhydrous sodium borate may also be used. Anhydrous sodium borate, $Na_2B_4O_7$, is also known variously as dehydrated borax, boron sodium oxide, anhydrous borax, Dehybor® (Borax Inc., Valencia, Calif.), sodium pyroborate, and sodium tetraborate. Anhydrous sodium borate is chemically hygroscopic, slightly soluble in cold water, and insoluble in acids.

The granular borate source material suitable for use may have a wide range of sizes. For example, size of the granular borate source material may range from about 400 mesh to about 2 mesh, U.S. Sieve Series. In some embodiments, size may range from about 150 mesh to about 8 mesh, from about 40 mesh to about 8 mesh, from about 40 mesh to about 20 mesh, from about 40 mesh to about 30 mesh, or from about 14 mesh to about 8 mesh.

The choice of sizes of granular borate source materials may depend on many factors such as the carrier fluid used, the concentration of the slurry composition, the anticipated swelling rate or anticipated time for forming plugs. For example, when the average sizes of granular borate source materials are large enough, an aqueous fluid can be used to carry the slurry composition, as the swelling of the granular borate source particles may be delayed for a long enough period of time that the slurry composition can be delivered to the desired location before substantial swelling of the materials occurs. Additionally, higher concentration of the slurry composition may slow down the full contact of the granular borate source particles with aqueous solution, and hence may delay the swelling of the granular borate source particles.

In one embodiment, the average size of the granular borate source particles is about 14 mesh or larger, and the swelling of the particles can be delayed for at least about 10 minutes. In one embodiment, the average size of the granular borate source particles ranges from about 14 mesh to about 8 mesh, and the swelling of the particles can be delayed for at least about 10 minutes, 20 minutes, or 30 minutes or more. For instance, boric oxide at 8 mesh size typically swells less than 30% after 30 minutes in water, less than 25% after 20 minutes in water and less than 20% after 10 minutes in water. For instance, boric oxide at 8 mesh size typically swells less than 30% after 30 minutes in water, less than 25% after 20 minutes in water and less than 20% after 10 minutes in water. Accordingly, it is possible to use an aqueous fluid as the carrier fluid when the granular borate source material will not swell substantially and immediately when placed in contact with the carrier fluid.

On the other hand, when the average sizes of the granular borate source particles are small enough, the particles may swell instantaneously or nearly instantaneously (e.g., within seconds, or within 1 minute to 10 minutes), once exposed to aqueous fluid to form a plug at the desired location. When the average size of the granular borate source particles is about 30 mesh or smaller, substantial swelling of the particles (e.g. 25%-40%) may occur within 1 minute thereby forming a plug vertical to the substantially horizontal wellbore. For instance, when the average size of the granular borate source particles is about 40 mesh or smaller, substantial swelling of the particles (e.g. 25%-40%) may occur instantaneously (e.g., within seconds upon contact with aqueous fluid); and when the average size of the granular borate source particles ranges from about 40 mesh size to about 30 mesh size, substantial swelling of the particles (e.g. 25%-40%) may occur within 1 minute after exposing the slurry composition to the aqueous liquid. When the average size of the granular borate source particles is about 30 mesh or larger, substantial swelling of the particles may occur within 3 to 30 minutes thereby forming a plug vertical to the substantially horizontal wellbore. For instance, when the average size of the granular borate source particles ranges from about 30 mesh to about 10 mesh, substantial swelling of the particles (e.g. 25%-40%) may occur within 3 to 10 minutes after exposing the slurry composition to the aqueous liquid.

The carrier fluid of the slurry composition may be a non-aqueous fluid. Any non-aqueous fluid known in the art as suitable for transporting a slurry may be used. Use of non-aqueous fluid as a carrier fluid can avoid or delay the pre-expansion of the partially dehydrated or anhydrous borate source material before transported and settled in the desired location in the wellbore. Exemplary non-aqueous fluids suitable for use include, but are not limited to, polar protic solvents such as glycols like ethylene glycol, propylene glycol, and alcohols like isopropanol; polar aprotic solvents like N,N-dimethylformamide, acetone, tetrahydrofuran, dichloromethane, 1,4-dioxane, dimethylsulfoxide, tetramethylenesulfone, acetonitrile, hexamethylphosphoramide, or 1,3-methyl-3,4,5,6-tetrahydro-2(1H)-pyrimidinone, carbonate like propylene carbonate, or ethylene carbonate, and combinations thereof.

The carrier fluid may also comprise a viscosity-increased substance, such as a gelling agent for gelling the fluid and increasing its viscosity. The increased viscosity of the carrier fluid may reduce fluid loss, enhance the suspension properties of the carrier fluid and allow the carrier fluid to transport significant quantities of suspended granular materials. The gelling agents may be biopolymers comprising natural, modified and derivatized polysaccharides, and derivatives thereof. Suitable gelling agents include, but are not limited to xanthan, diutan, guar and derivatives of guar gum, galactomannan gum, cellulose and derivatives thereof, and combinations thereof. The carrier fluid may also include one or more of a variety of well-known additives such as breakers, stabilizers, fluid-loss-control additives, clay stabilizers, bactericides, and the like.

The slurry composition may also comprise other particulate materials commonly used in sand plug operations. These particulate materials may be blended with the partially dehydrated or anhydrous granular borate source material to form a slurry composition in the carrier fluid. Suitable particular materials include, but not limited to sand, ceramic beads, bauxite, glass microspheres, synthetic organic beads, sintered materials and combinations thereof. Suitable particular materials may also include polymer materials, Teflon® materials, nut shell pieces, seed shell pieces, cured resinous particulates comprising nut shell pieces, cured resinous particulates comprising seed shell pieces, fruit pit pieces, cured resinous particulates comprising fruit pit pieces, wood, composite particulates and combinations thereof.

In some embodiments, the particulate materials to be blended with borate source materials are degradable materials including, but not limited to, degradable polymers, dehydrated compounds, and mixtures thereof. Suitable examples of degradable polymers that may be used include, but are not limited to, homopolymers, and random, block, graft, and star- or hyper-branched polymers. Specific examples of suitable polymers include polysaccharides such as dextran or cellulose, chitin, chitosan, proteins, aliphatic polyesters, poly(lactide), poly(glycolide), poly($\epsilon$-caprolactone), poly(hydroxybutyrate), poly(anhydrides), aliphatic polycarbonates, poly (ortho esters), poly(amino acids), poly(ethylene oxide), and polyphosphazenes. Polyanhydrides are another type of suitable degradable polymer. Examples of suitable polyanhydrides include poly(adipic anhydride), poly(suberic anhydride), poly(sebacic anhydride), and poly(dodecanedioic anhydride). Other suitable examples include, but are not limited to, poly(maleic anhydride) and poly(benzoic anhydride). The aforementioned particulate materials may be found, for instance, in U.S. Patent Application Publication Nos. 2009/0223667 and 2009/0242202, which are incorporated herein by reference in their entirety.

In choosing the appropriate particulate materials, one should consider the compatibility of the particulate materials with the borate source materials. The particulate materials should not adversely affect the expandability of the partially dehydrated or anhydrous borate source materials and solubility of the hydrated borate source materials. Moreover, in choosing the appropriate degradable material, one should consider the degradation products that will result. In general, the degradation products should not adversely affect subterranean operations or components. The choice of degradable material also can depend, at least in part, on the conditions of the wellbore, e.g., wellbore temperature. For instance, lactides have been found to be suitable for lower temperature wells, including those within the range of 60° F. to 150° F., and polylactides have been found to be suitable for wellbore temperatures above this range. Poly(lactic acid) and dehydrated salts may be suitable for higher temperature wells. Also, in some embodiments a preferable result is achieved if the degradable material degrades slowly over time as opposed to instantaneously. Accordingly, in some embodiments, it may be desirable to utilize a degradable material that does not substantially degrade until after the degradable material has been substantially placed in a desired location within a wellbore.

When placing the slurry composition in the horizontal wellbore, the height of the initial fill will vary based, in part, on the concentration of the granular borate source material in the carrier fluid used for the slurry composition. In some embodiments, the concentration may range from about 1 pound of the granular borate source material per gallon of carrier fluid (lbs/gal) to about 30 lbs/gal, from about 10 lbs/gal to about 25 lbs/gal, or from about 15 lbs/gal to about 20 lbs/gal. In some embodiment, the volume percentage of the granular borate source material in the slurry composition may range from about 4% v/v to about 60% v/v, for instance, from about 30% v/v to about 55% v/v, or from about 40% v/v to about 50% v/v. Low-concentration slurries may not permit sufficient deposition of granular materials within the wellbore to form plugs; however, slurries with high concentration and excessive densities may result in granular material deposits within the pumping conduit.

Often, the slurry placed in a horizontal wellbore will not fill the entire vertical span of the wellbore. For example, when a slurry composition of about 42% v/v granular materials is used, a fill height of about 60-70% might be expected and when a slurry composition of about 48% v/v granular materials is used, a fill height of about 70-80% might be expected. One skilled in the art, knowing the relative deviation of the wellbore at issue, the pumping rates, and the carrier fluid compositions will be able to determine a suitable slurry concentration to be used.

With the aqueous expandable slurry composition, filling the complete vertical height of the wellbore or casing is not necessary. The slurry composition, when exposed to aqueous solution, will expand and substantially or completely bridge a portion of the wellbore. The method provides an easy and rapid way of setting sand plugs in a horizontal wellbore that can more reliably set the sand plug the first time. Once the slurry composition has been introduced to the desired location in the wellbore, it is allowed to settle for a period of time and form into a plug that is vertical to the horizontal wellbore. In some embodiments, the slurry composition may be allowed to settle and form a plug as little as 1 minute, or within ten minutes. One skilled in the art can also adjust certain parameters such as pumping rate, the concentration of the slurry composition, and the carrier fluid composition to achieve a desirable time of setting the sand plug in the horizontal wellbore, for instance, from 1 minute to 30 minutes or longer.

In some embodiments, when the carrier fluid is a non-aqueous fluid, the non-aqueous fluid is water-miscible to aid the contact of the partially or anhydrous borate source material with aqueous fluid. After the carrier fluid places the slurry composition at the desired location of the wellbore, the slurry composition is further exposed to an aqueous fluid. This may be accomplished by various ways. For example, an aqueous fluid may be flowed across the top of the slurry composition or particle bed formed from settling of the slurry composition. Water covers the slurry composition or particle bed, and/or replaces the non-aqueous fluid (if the carrier fluid is a non-aqueous fluid) of the slurry composition or particle bed, reacts with the partially dehydrated or anhydrous borate source material, and expands the slurry composition or particle bed.

The water-miscibility of the non-aqueous fluid typically makes the replacement of the non-aqueous fluid faster and easier, thereby aiding in expanding of the slurry composition or particle bed to rapidly bridge of the desired portion of the wellbore.

For expanding the slurry composition, an additional source of aqueous fluid may be introduced into the wellbore after the slurry composition is placed in the desired location. Alternatively, the aqueous fluid may be already contained in the wellbore at the time the slurry composition is introduced into the wellbore. For instance, when the carrier fluid is an aqueous fluid, additional aqueous fluid may or may not need to be introduced into the wellbore to expand the slurry composition. The aqueous fluid used to expand the slurry composition may be fresh water, salt water (e.g., water containing one or more salts dissolved therein), brine (e.g., saturated salt water), seawater, formation water, or various other aqueous treatment fluids introduced into the wellbore during various treatments. As used herein, the term "treatment fluid" generally refers to any fluid that may be used in a subterranean application in conjunction with a desired function and/or for a desired purpose. The term "treatment fluid" does not imply any particular action by the fluid or any component thereof. By way of example, a treatment fluid, in conjunction with a desired function and/or for a desired purpose, is a fluid that may be used to expand the slurry composition, such as a stimulating fluid, a completion fluid, a fracturing fluid, a workover fluid, or combinations thereof. Exemplary treatment fluids include, but are not limited to, aqueous acid solution, aqueous scale inhibiting material solution, aqueous water blocking material solution, aqueous corrosion inhibiting material solution, aqueous clay stabilizer solution, aqueous shale stabilizer solution, aqueous friction reducer solution, aqueous chelating agent solution, aqueous surfactant solution, aqueous paraffin removal solution, aqueous biocide solution, aqueous non-emulsifier solution, and combinations thereof.

As used herein, a material is considered to be "aqueous expandable" if a volume of the material can expand at least about 2.5%, at least about 5%, or at least about 10% in the presence of an aqueous fluid. Some of the granular borate source material, at least partially dehydrated or anhydrous, used herein are known to expand in an aqueous fluid about 100% (200% of it original volume). In some embodiments, the granular borate source particles expands to at least about 20% (120% of its original volume) to about 50% (150% of its original volume) when exposed to the aqueous liquid. For example, anhydrous boric oxide in various seawater solution of scale inhibitors or 15% hydrochloric acid expands at least to about 120% of its original volume, and more typically in the range of about 150% to about 210% of its original volume, depending on the aqueous solution. Anhydrous sodium tetraborate in a 10% ammonium salt containing a scale inhibitor/seawater solution expands to about 120% of its original volume.

Other aqueous-expandable particulate materials can also be included in the slurry composition to be used in combination with the borate source material. Exemplary aqueous-swellable particles suitable for use herein include particulate sodium or potassium salt of polyacrylic acid or alginic acid, polyacrylate-cellulose graft copolymer, collagen, chitin, chitosan, dextran, carboxymethyldextran, starch, modified starch, hydroxyethyl starch, hydrolyzed polyacrylonitrile, starch-methacrylonitrile polymer, polyacrylamide, hydrolyzed polyacrylamide (Separan®AP-30, Dow Chemical Co.), carboxymethylcellulose, and derivatives and combinations thereof.

Some aqueous-expandable materials may be sensitive to pH and other factors. The level of volume expanding of the material may be dependent on the particular aqueous solution used. Some aqueous-expandable materials may expand when exposed to a basic aqueous fluid, and may not expand in an acidic fluid. For example, anhydrous sodium borate can be water-expandable when exposed to basic aqueous fluids, but it may swell slightly, or not at all, in some neutral or acidic solutions.

In some embodiments of the invention, the plug formed in the substantially horizontal wellbore is temporary and can be removed by exposing the expanded slurry composition to a sufficient amount of aqueous liquid to at least partially dissolve and degrade the expanded slurry composition. The solubility of a substance is the maximum amount of a material that can be dissolved in given quantity of a given solvent at a given temperature. A material is considered soluble or dissolvable even if it takes a substantial amount of time to reach saturation. Hence the aqueous soluble or aqueous dissolvable may also refer to materials that are eventually soluble or dissolvable after the plug is formed and the isolation stage is completed so that the materials forming the plug can be removed without cleaning-up or mechanical removal procedures.

The granular borate source materials used that are at least partially dehydrated or anhydrous, such as anhydrous boric acid, are only slightly soluble in water. However, with time and heat inside the wellbore, these partially dehydrated or anhydrous borate source materials are hydrated by the exposed surrounding aqueous fluid. The resulting hydrated borate materials are highly soluble in water as compared to the partially or anhydrous borate source materials and as a result are dissolved in the aqueous fluid. The total time required for the partially or anhydrous borate source materials to degrade and dissolve in an aqueous fluid is in the range of from about 8 hours to about 72 hours, depending upon the amount of water the borate source materials are exposed to and the temperature inside the wellbore in which they are placed. The hydration time and mechanism of the partially dehydrated or anhydrous borate source materials in the wellbore, as well as the relevant wellbore parameters impacting the hydration of the borate source materials have been described in, e.g., U.S. Pat. No. 6,896,058 and U.S. Patent Application Publication No. 2007/0277979, which are incorporated herein by reference in their entirety.

In some embodiments, depending on the temperature and the type of aqueous fluid used, the same aqueous liquid that initially expands the slurry composition, after contacting with the slurry composition for a sufficient time, may be present in an amount sufficient to eventually hydrate the partially or anhydrous borate source materials and at least partially dissolve the expanded slurry composition.

In other embodiments, the aqueous liquid to hydrate the partially or anhydrous borate source materials and to dissolve the expanded slurry composition is different from the aqueous fluid initially expands the slurry composition. For example, after the need of isolation stage has passed, an additional source of aqueous liquid may be introduced into wellbore and to hydrate or speed and/or complete the hydration and dissolution of the partially dehydrated or anhydrous borate source materials in the slurry composition.

Another aspect of the invention provides a method of treating one or more subterranean zones intersected by one or more substantially horizontal wellbores extending outwardly from one or more parent wellbores. The method comprises the steps of introducing into one or more substantially horizontal wellbores a slurry composition comprising a carrier fluid and a granular borate source material, wherein the borate source material is at least partially dehydrated; allowing the slurry composition to settle in the one or more horizontal wellbores and at least partially fill at least a portion of the one or more horizontal wellbores in a direction vertical to the one or more horizontal wellbores; and exposing the slurry composition to a sufficient amount of aqueous fluid. The aqueous fluid expands the slurry composition to the point that the expanded slurry composition substantially fill at least a portion of the one or more horizontal wellbores in a direction vertical to the horizontal wellbores, thereby plugging the one or more horizontal wellbores and treating the one or more subterranean zones intersected by the one or more substantially horizontal wellbores extending outwardly from the one or more parent wellbores.

Once a zone of interested has been isolated, subsequent well operations, such treatment of additional zones, can be carried out. The treating method can then further comprise a step of injecting a treatment fluid into the subterranean zones to treat one or more subterranean zones that are not closed off by the plugs resulting from the plugging of the substantially horizontal wellbores.

The methods may be used in conjunction with any wellbore operations where there is a need for plugging and isolating a portion of wellbore. Exemplary wellbore operations include, but not limited to, well completing, servicing, stimulating, workover operations and the like. For example, completion operations are generally performed after a wellbore has been drilled to a desired depth. Such completion operations may include inserting a liner or casing into the wellbore and, at times, cementing a casing or liner into place. Once the wellbore is completed as desired (lined, cased, open hole, or any other known completion) a stimulation operation may be performed to enhance hydrocarbon production into the wellbore.

By way of example, a treatment fluid injected into the subterranean zones to treat one or more subterranean zones, in conjunction with a desired function and/or for a desired purpose, may include, but not limited to, a stimulating fluid, a completion fluid, a fracturing fluid, a workover fluid, and combinations thereof. For example, for a stimulation operation, the treatment fluid may be a hydraulic fracturing fluid, acidizing fluid, fracture acidizing fluid and the like.

The methods may be used along wellbores with any known completion style, including lined, cased and lined, open hole, cemented, or in any other fashion known in the art. The invention may be applied to portions along an older wellbore or to newly drilled portions of a wellbore. Additionally, the invention may be applied to portions of a wellbore, or to subterranean zones intersected by one or more horizontal wellbores extending outwardly from one or more parent wellbores.

EXAMPLES

Example 1

The middle three inches of a six-inch long piece of ¾" Tygon® tubing was filled to about 65% full of boric oxide (the 65% height comes from the fact that a 15 lb/gal slurry of sand would settle to this point). Water was slowly flowed across the bed. Within about 10 minutes, the outside diameter (OD) of the tubing was measured. At each end, where no boric oxide was placed, the dimensions of the tubing OD were still in the 0.73-0.75 inches range. At the center point, swelling had occurred and the tubing OD had been stretched to 0.87 inches (See schematic in FIG. 1).

Example 2

A non-aqueous liquid was used to carry boric oxide particles and transport them to a tubing in a uniform layer filling 60% to 65% of the tubing volume. After the boric oxide was placed sufficiently within the tubing, a steady stream of tap water was poured into the funnel and through the non-aqueous liquid, displacing it and contacting the boric oxide. A dial indicator was used to monitor the expansion due to the boric oxide swelling.

The boric oxide was measured using a graduated cylinder to a volume of 30 mls. This is sufficient to fill the 8.5 inch flat area of the Tygon® tubing to approximately 65% of total height. Three different carrier fluids were used to place the particles in the tube: ethylene glycol, propylene glycol, and isopropanol. When the boric acid contacted the water without the use of a non-aqueous fluid, the reaction occurred rapidly, within a few seconds, swelling and producing significant heat; in excess of 200° F. Using the glycols as carrier fluids delayed the reaction of boric acid with water when water was introduced. For instance, when the glycols were used to place the particles, a delay of 30 minutes was recorded before any signs of particle swelling or produced heat were noted. Isopropanol was then used in attempt to shorten this delay time. While it may be easier for water to displace isopropanol, the delay of 30 minutes was still observed.

To further analyze this delay of reaction time between boric acid and water, a dry boric oxide particle layer was placed into the tubing and water was added to start the reaction. The reaction was nearly instantaneous, swelling occurred, and heat was produced. An expansion of tubing was recorded with an increase of 0.1 inch. This expansion is in addition of the 35% void left in the tubing before adding the water.

Example 3

In this example, the swelling rates of boric oxide particles as a function of particle size were tested in water.

Boric oxide materials were sieved into particles with sizes within different ranges, as shown in Table 1. The swelling experiments were performed for particles at each size range respectively. For each experiment, particles were separated by particular size range, in this case particles at 8 mesh, 10-12 mesh, 12-14 mesh, 16-18 mesh, 20-30 mesh, 30-40 mesh, and 40 mesh and smaller, and were loaded into a 5 ml graduated cylinder to fill in about 1 ml of the bottom of the cylinder. A long needle was inserted in the pack of particles touching the bottom of the cylinder for fluid injection. At time=0, enough water was injected into the pack of particles to completely cover the particles. The height/volume of the particle pack was then monitored with time and recorded in Table 1.

As shown in Table 1, the swelling of particles generally resulted in an approximate doubling of the original volume of particles (i.e., 100% expansion or increase in the volume of particles). The trend of particles volume eventually reaching 200% of the original volume can be clearly seen in Table 1 with most of the experiments eventually expanded to 2 mL or close to 2 mL (the randomness of testing accounted for some of the differences). The table also illustrates that the rate of swelling differs according to particle size. Smaller particles such as those with sizes about 40 mesh or smaller and those with sizes about 30/40 mesh finished swelling within about one to two minutes; however, larger particles, for instance, those with sizes greater than 8 mesh were still swelling at the end of one hour.

TABLE 1

Swelling of particles in water

| Time (min) | Volume of particles at different particle sizes (mL) | | | | | | |
|---|---|---|---|---|---|---|---|
| | >8[a] | 10/12[a] | 12/14[a] | 16/18[a] | 20/30[a] | 30/40[a] | 40[a] or smaller |
| 0 | 1.1 | 1 | 1 | 1.1 | 1.1 | 1.1 | 1.1 |
| 0.37 | 1.1 | 1.2 | 1.2 | 1.3 | 1.3 | 1.3 | 1.7 |
| 0.6 | 1.1 | 1.2 | 1.2 | 1.3 | 1.3 | 1.3 | 1.8 |
| 0.73 | 1.1 | 1.2 | 1.2 | 1.3 | 1.3 | 1.3 | 1.8 |
| 1 | 1.15 | 1.25 | 1.25 | 1.35 | 1.35 | 1.4 | 1.85 |
| 1.5 | 1.15 | 1.3 | 1.3 | 1.4 | 1.4 | 1.65 | 1.85 |
| 2 | 1.15 | 1.3 | 1.3 | 1.4 | 1.45 | 1.7 | 1.85 |
| 2.5 | 1.15 | 1.3 | 1.3 | 1.4 | 1.45 | 1.7 | 1.85 |
| 3 | 1.2 | 1.3 | 1.3 | 1.4 | 1.5 | 1.7 | 1.85 |
| 4 | 1.2 | 1.3 | 1.3 | 1.45 | 1.6 | 1.7 | 1.85 |
| 5 | 1.2 | 1.35 | 1.3 | 1.5 | 1.6 | 1.7 | 1.85 |
| 6 | 1.2 | 1.4 | 1.35 | 1.55 | 1.7 | 1.7 | 1.85 |
| 7 | 1.25 | 1.4 | 1.4 | 1.6 | 1.75 | 1.7 | 1.85 |
| 8 | 1.25 | 1.4 | 1.4 | 1.6 | 1.75 | 1.7 | 1.85 |
| 9 | 1.25 | 1.45 | 1.4 | 1.7 | 1.75 | 1.7 | 1.85 |
| 10 | 1.3 | 1.4 | 1.4 | 1.7 | 1.8 | 1.7 | 1.85 |
| 15 | 1.3 | 1.6 | 1.5 | 1.8 | 1.95 | 1.7 | 1.85 |
| 20 | 1.35 | 1.7 | 1.65 | 1.9 | 2 | 1.7 | 1.85 |
| 25 | 1.35 | 1.75 | 1.7 | 1.95 | 2 | 1.7 | 1.85 |
| 30 | 1.4 | 1.8 | 1.75 | 1.95 | 2.05 | 1.7 | 1.85 |
| 60 | 1.6 | 1.9 | 1.85 | 2 | 2.05 | 1.7 | 1.85 |

[a]U.S. sieve size

We claim:

1. A method for plugging a substantially horizontal wellbore, the method comprising:
   introducing into the wellbore a slurry composition comprising a carrier fluid and a granular borate source material, wherein the borate source material is selected from the group consisting of a sodium perborate monohydrate; a sodium perborate trihydrate; and any combination thereof;
   allowing the slurry composition to settle in the horizontal wellbore and at least partially fill at least a portion of the horizontal wellbore in a direction vertical to the substantially horizontal wellbore; and
   exposing the slurry composition to a sufficient amount of aqueous fluid whereby the aqueous fluid swells the granular borate source material to thereby expand the slurry composition to the point that the expanded slurry composition substantially fills at least a portion of the horizontal wellbore in a direction vertical to the horizontal wellbore, thereby plugging the substantially horizontal wellbore.

2. The method of claim 1, further comprising the step of exposing the expanded slurry composition to a sufficient amount of aqueous liquid to at least partially dissolve the expanded slurry composition, thereby at least partially removing the plug from the substantially horizontal wellbore.

3. The method of claim 1, wherein the concentration of the borate source material in the slurry composition is at least about 15% v/v.

4. The method of claim 1, wherein the average size of granular borate source material is about 40 mesh or smaller, and wherein a plug vertical to the substantially horizontal wellbore is formed instantaneously or nearly instantaneously when exposing the slurry composition to the aqueous liquid.

5. The method of claim 1, wherein the average size of granular borate source material is about 30 mesh or smaller, and wherein a plug vertical to the substantially horizontal wellbore is formed within 1 minute after exposing the slurry composition to the aqueous liquid.

6. The method of claim 1, wherein the average size of granular borate source material is about 30 mesh or larger, and wherein a plug vertical to the substantially horizontal wellbore is formed within 3 to 30 minutes after exposing the slurry composition to the aqueous liquid.

7. The method of claim 1, wherein the average size of granular borate source material is about 14 mesh or larger, and wherein swelling of slurry composition is delayed for at least 10 minutes or more.

8. The method of claim 1, wherein the carrier fluid is an aqueous fluid and wherein the average size of granular borate source material is about 14 mesh or larger.

9. The method of claim 1, wherein the carrier fluid is a water-miscible non-aqueous fluid selected from the group consisting of ethylene glycol, propylene glycol, isopropanol, N,Ndimethylformamide, acetone, tetrahydrofuran, dichloromethane, 1,4-dioxane, dimethylsulfoxide, tetramethylenesulfone, acetonitrile, hexamethylphosphoramide, 1,3-methyl-3,4,5,6-tetrahydro2(1H)-pyrimidinone, propylene carbonate, ethylene carbonate, and combinations thereof.

10. The method of claim 1, wherein the aqueous fluid is a treatment fluid selected from the group consisting of a stimulating fluid, a completion fluid, a fracturing fluid, a workover fluid, and combinations thereof.

11. A method of treating one or more subterranean zones intersected by one or more wellbores extending outwardly from one or more parent wellbores, the method comprising:

introducing into the one or more wellbores a slurry composition comprising a carrier fluid and a granular borate source material, wherein the borate source material is selected from the group consisting of a sodium perborate monohydrate; a sodium perborate trihydrate; and any combination thereof;

allowing the slurry composition to settle in the one or more wellbores and at least partially fill at least a portion of the one or more wellbores in a direction vertical to the one or more wellbores; and exposing the slurry composition to a sufficient amount of aqueous fluid whereby the aqueous fluid swells the granular borate source material to thereby expand the slurry composition to the point that the expanded slurry composition substantially fills at least a portion of the one or more wellbores in a direction vertical to the wellbores, thereby plugging the one or more wellbores and treating the one or more subterranean zones intersected by the one or more substantially wellbores extending outwardly from the one or more parent wellbores.

12. The method of claim 11, wherein the carrier fluid is a water-miscible non-aqueous fluid selected from the group consisting of ethylene glycol, propylene glycol, isopropanol, N,Ndimethylformamide, acetone, tetrahydrofuran, dichloromethane, 1,4-dioxane, dimethylsulfoxide, tetramethylenesulfone, acetonitrile, hexamethylphosphoramide, 1,3-methyl-3,4,5,6-tetrahydro2(1H)-pyrimidinone, propylene carbonate, ethylene carbonate, and combinations thereof.

13. The method of claim 11, wherein the carrier fluid is an aqueous fluid and the average size of granular borate source material is about 14 mesh or larger.

14. The method of claim 11, further comprising a step of injecting a treatment fluid into the subterranean zones to treat one or more subterranean zones that are not closed off by the plugs resulting from the plugging of the wellbores.

15. The method of claim 14, further comprising the step of exposing the expanded slurry composition to a sufficient amount of aqueous liquid to at least partially dissolve the expanded slurry composition, thereby removing the plug from the one or more wellbores.

* * * * *